June 30, 1959 — F. H. INE — 2,892,462
SHRINK TANK FOR PACKAGED ARTICLES
Filed Dec. 30, 1954
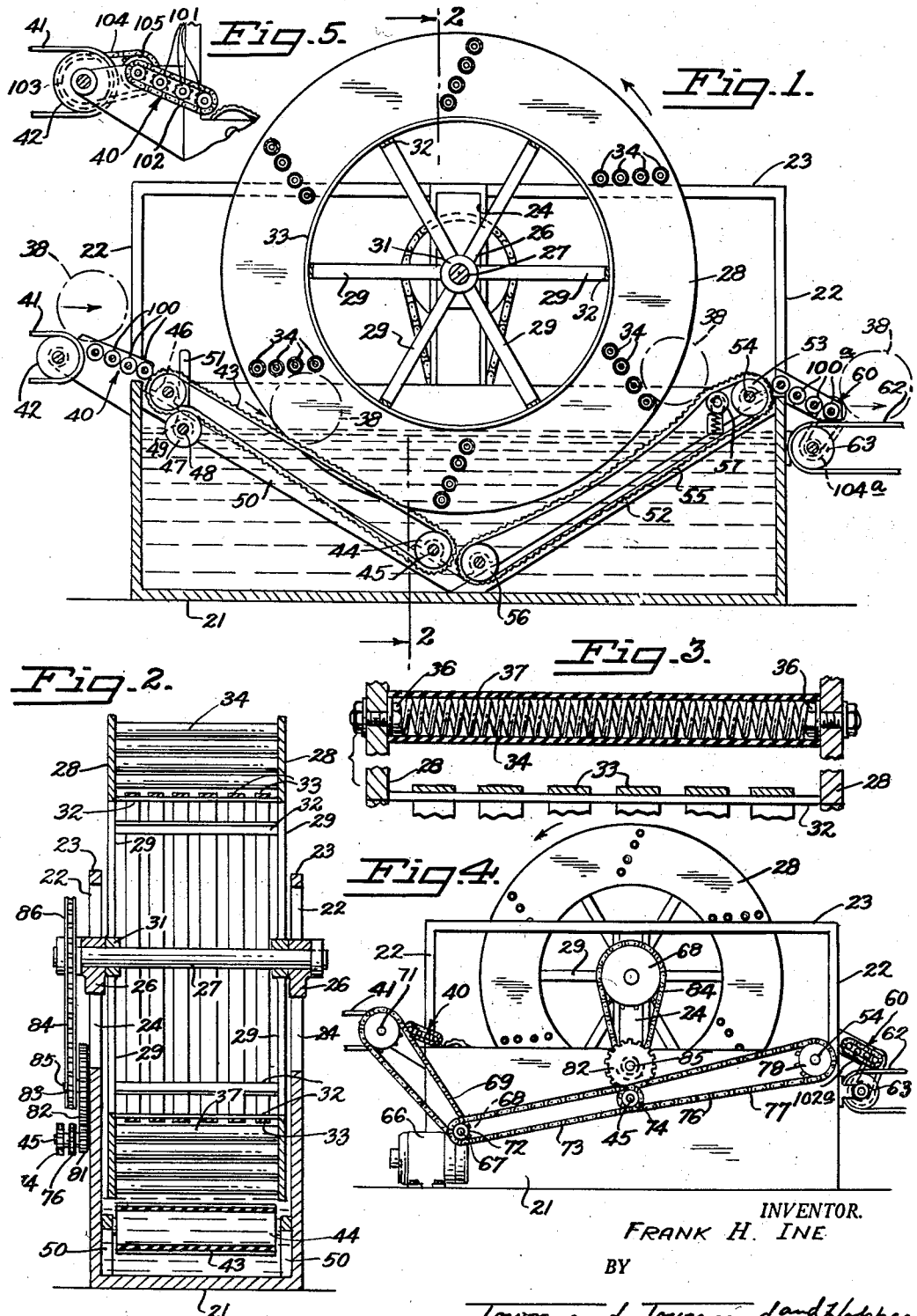
INVENTOR.
FRANK H. INE
BY
Townsend, Townsend and Hoppe
ATTORNEYS United States Patent Office 2,892,462
Patented June 30, 1959

2,892,462

SHRINK TANK FOR PACKAGED ARTICLES

Frank H. Ine, Milwaukee, Wis.

Application December 30, 1954, Serial No. 478,711

11 Claims. (Cl. 134—126)

This invention relates to a new and improved shrink tank for packaged articles. More particularly, the invention relates to a shrink tank to submerge packages wrapped in shrinkable plastic bags to accomplish uniform and thorough shrinkage. Poultry, meat products and other objects, particularly irregularly shaped objects, are frequently encased in plastic bags made of such materials as a copolymer of vinylidine and vinyl chloride, a material sold by the Dow Chemical Company under the trademark Saran. Such bags are conventionally sprayed or doused with warm water in order to shrink the plastic bag into close conformity to the shape of the object.

The present invention relates to the provision of a tank of warm water in which the packaged articles are dipped in order to shrink the bags. Feaures of the invention are the provision of a system of two conveyors, one to convey the articles downwardly toward the center of the tank, and the other to convey the articles upwardly and discharge the same from the tank. Cooperating with the conveyors is a drum suspended above the tank and having the lower portion of its periphery immersed in the tank, which drum is formed with peripherally spaced outwardly extending pocket-forming members to receive the packages and to insure their adequate immersion and discharge at the completion of immersion.

The apparatus hereinafter described has for one of its particular objects the handling of the packages in such manner that the bags are not damaged by the conveying and immersing apparatus. It will be understood that plastic material is fragile and that rough handling will cause breakage. Gentle handling of the bags is insured in accordance with the present invention.

One of the features of the invention is the provision of transversely extending springs mounted on the submerging drum, the springs being arranged in patterns hereinafter described, which define the pockets of the wheel heretofore mentioned. The springs are encased in flexible rubber sleeves which permits resilient yieldability of the pocket forming members if they should strike against a packaged article and, as a consequence, will prevent the bags from being damaged or torn or from being pinched between the coils of the springs.

Another feature of the invention is the provision of a pair of annular disks on the sides of the drum which are spaced apart a distance slightly greater than the widths of the conveyors which are located within the tanks. The disks prevent the packages from moving off the conveyors in a sideward direction.

Another object is to provide a novel power driven bridging conveyor for conveying packaged articles into a shrink tank or the like.

Other objects of the present invention will become apparent upon reading the following specification and referring to the accompanying drawings in which similar characters of reference represent corresponding parts in each of the several views.

In the drawings:

Fig. 1 is a longitudinal vertical section through the shrink tank;

Fig. 2 is a vertical section taken substantially along the line 2—2 of Fig. 1;

Fig. 3 in an enlarged fragmentary sectional view of the springs and rubber sleeves which form part of the submerging wheel;

Fig. 4 is a side elevation in reduced scale of the tank; and

Fig. 5 is an enlarged fragmentary view of a novel power driven bridging conveyor.

The shrink tank 21 is a conventional rectangular tank which is filled with water and maintained at an elevated temperature by heating means (not shown). The tank 21 is provided with a superstructure comprising vertical members 22 at each corner of the tank, pairs of vertical members being connected by longitudinally extending horizontal members 23. Extending downwardly from the longitudinal members 23 approximately at the center of the tank and on each side thereof is a vertically disposed channel 24 which slidably receives bearing blocks 26 supporting transverse horizontal shaft 27 of the submerging wheel. Concentric with shaft 27 are annular rims 28 which are held in position by radial spokes 29 extending outwardly from hub 31 on shaft 27. Spokes 29 likewise support at their opposite ends transverse horizontal support members 32 which support circular hoops 33. The hoops 33 are spaced apart with gaps therebetween and function to provide a drum which limits radially inward movement of the packages received in the submerging wheel between the annular disks 28. Transversely extending helical coil springs 34 extend from side to side between the disks 28 and are attached thereto by bolts 36 which grip the ends of the springs and are threaded into the adjacent disks 28. Flexible rubber sleeves 37 encase the springs 34 and prevent the packages received in the submerging wheel from being pinched between the coils of the spring. As is particularly apparent in Fig. 1, there are six sets of springs 34 with four springs to each set. The pattern of the centers of the springs is along a chordal line which is rearwardly outwardly directed in respect to the direction of rotation of the submerging wheel. The centers of the springs 34 are spaced apart equal distances along said line so that the outermost spring 34 is about one inch inward from the periphery of disk 28, whereas the innermost of the springs 34 of each set is closely adjacent to the hoops 33. The flexible nature of the springs 34 and their pattern of location insures that packages received in the pockets defined by the springs will be conveyed out of the tank and discharged without tendency to be trapped in a pocket and carried around the wheel for a second passage through the tank. Likewise, the flexible nature of the springs permits the springs to give and hence prevents crushing of the package 38 if it should be fed into the tank at the precise time that it contacts one of the pocket forming outer springs 34.

Packages 38 are fed into the machine by loading conveyor belt 41, driven by horizontal transverse pulley 42, and bridging conveyor assembly 40. Conveyor assembly 40 comprises, more specifically, a plurality of conveyor rollers, such as indicated at 100, each of which is provided with a sprocket gear 101. All of the sprocket wheels are connected and engaged by a sprocket chain 102 which, in turn, is driven by power supplied from roller 42 provided with a drive sprocket 103 and connected by sprocket chain 104 to a driven sprocket 105 provided on the adjacent end roller of conveyor assembly 40. By power-driving each of the rollers 100 in the bridging conveyor 40, travel of the packaged articles at uniform and uninterrupted speed from the loading belt 41 into the shrink tank is assured with no practical possibility of the articles slowing down or stopping on the bridging conveyor. The packages discharged from the conveyor 40 roll onto intake conveyor belt 43 which has a corrugated surface which facilitates movement of the packages 38 therealong. Belt 43 is driven by drive pulley 44 which is located adjacent the bottom and center of the tank 21 and extends transversely thereacross. Pulley 44 is mounted upon transverse shaft 45, one end of which extends out through one side of the tank 21. The opposite end of conveyor belt 43 is supported by idler pulley 46 which in turn extends transversely across the tank 21 near the intake end thereof and immediately below the level of belt 41.

A tightener pulley 47 is mounted on shaft 48, each end of which is received in collar 49. Tightener mechanism 51 is arranged to raise and lower collar 49, thereby adjusting the tightness of the conveyor belt 43. Intake subframe 50 which extends longitudinally downwardly from the intake end of the tank to adjacent the bottom and center of the tank provides a mounting for the pulleys 44, 46 and 47.

Discharge conveyor belt 52 receives the packages 38 coming off the lower and inner end of intake conveyor belt 43. Belt 52 extends upwardly toward the discharge end of the tank 21 and is similarly constructed of corrugated rubber. Drive pulley 53 drives belt 52 and is mounted on transverse horizontal shaft 54 located near the discharge end of the tank 21. Idler pulley 56 is located near the bottom and center of the tank slightly below the level of the pulley 44 and to the discharge side thereof. Spring mounted intermediate pulley 57 is disposed beneath the upper flight of belt 52 and functions to displace the upper end of said flight into proximity with adjacent spring pusher units 34 to insure proper discharge of the articles from the tank. Pulleys 53, 56 and 57 are supported by frame 55 which slants upwardly from adjacent the bottom and center of the tank to the discharge side thereof.

Packages from conveyor belt 52 are discharged onto horizontal unloading belt 62 via bridging conveyor assembly 60. The near end of belt 62 is supported by idler pulley 63. The construction and operation of bridging conveyor 60 may be considered substantially identical to conveyor 40, it being noted that the individual rollers of assembly 60 are all connected by a sprocket chain drive driven from power supplied from pulley 63. The component elements comprising assembly 60 are numbered similarly to corresponding components of assembly 40 but are suffixed by the letter "a" to distinguish them in the drawings.

The various wheels and conveyors heretofore described are driven by an electric motor 66 having reduction gear of conventional construction containing a drive shaft 67. Shaft 67 turns sprocket 68 which drives chain 69, which in turn drives sprocket 71 on pulley 42 of intake belt 41. Shaft 67 likewise contains a sprocket 72 which drives chain 73 and in turn drives sprocket 74 on shaft 45 which drives intake conveyor belt 43. Sprocket 76 on shaft 45 drives chain 77, which drives sprocket 78 on shaft 54 which drives the discharge conveyor 52. It will thus be seen that belts 41, 43 and 52 are all driven by a common source and at equal speeds.

Shaft 45 likewise contains pinion 81 which meshes with a gear 82 on a stub shaft 85. Shaft 85 drives sprocket 83, which drives chain 84, and chain 84 drives sprocket 86 on the shaft 27 of the submerging drum. The gear ratio and the ratio of the sprockets is such that the peripheral speed of the outermost spring 34 is substantially equal to the lineal speed of the belts heretofore described.

In operation, packages 38 travel along the upper stretch of the belt 41 toward the right as viewed in Fig. 1 and drop off by gravity onto the belt 43, the upper stretch of which moves downwardly toward the right as viewed in Fig. 1. As the packages are deposited on the belt 43, they tend to fall into one of the pockets between the sets of springs 34 of the submerging drum disks 28, the peripheral speed of the outermost springs 34 being substantially equal to the lineal speed of the belt 43 as above stated. The springs 34 flex to prevent crushing of the packages between the springs 34 and the belt 43 and in general their flexible nature prevents damage to the package. Thus the packages 38 are propelled downwardly and are submerged by the cooperative action of the springs 34 and the hoops 33. At the lowermost position in the tank the packages transfer to the upwardly moving upper stretch of discharge conveyor belt 52 and are carried up over the edge of the tank 21 where they drop by gravity onto the upper stretch of the conveyor belt 62. The pattern of the springs 34 is such as to insure that the packages are discharged from the pockets of the submerging drum and do not lodge in the pockets so that they are not carried around into the next cycle of submersion.

Although the foregoing invention has been described in some detail by way of illustration and example for purposes of clarity of understanding, it is understood that certain changes and modifications may be practiced within the spirit of the invention and scope of the appended claims.

What is claimed is:

1. A shrink tank comprising: an elongated tank; first means in said tank for guiding articles disposed thereon from the top of one end of said tank downwardly toward the bottom of said tank and thence upwardly to the opposite end of said tank; a large diameter drum having an axis of rotation transverse to the direction of movement of articles on said first means, said drum being disposed above said first means with the lower portion of its periphery submerged in said tank and spaced above said first means; a pair of spaced disks mounted adjacent opposite ends of said drum and of larger diameter than said drum disposed with their lower peripheries submerged in said tank and disposed to opposite sides of said first means; a plurality of peripherally spaced, resiliently yieldable pocket-forming members extending transversely between said disks and rotatable with said drum and said disks; and third means for rotating said drum, said disks and said pocket-forming members to submerge articles within said tank and to advance them along said first means.

2. A shrink tank according to claim 1 in which said pocket-forming members comprise helical springs and flexible tubes covering said springs.

3. A shrink tank according to claim 1 in which said pocket-forming members are located with the outermost member located rearwardly relative to the innermost member relative to the direction of rotation of said drum.

4. A shrink tank according to claim 1 in which said drum is perforate.

5. A shrink tank according to claim 1 in which the periphery of said drum comprises a plurality of spaced, annular, parallel hoops.

6. A shrink tank comprising: an elongated tank; conveyor means in said tank for guiding articles disposed thereon from the top of one end of said tank downwardly toward the bottom of said tank and thence upwardly to the opposite end of said tank; a large diameter drum having an axis of rotation transverse to the direction of movement of articles on said first means; said drum being disposed above said first means with the lower portion of its periphery submerged in said tank and spaced above said conveyor means; a pair of spaced disks mounted adjacent opposite ends of said drum and rotatable therewith; said disks having a larger diameter than said drum and disposed with their lower peripheries in submerged position to opposite sides of said conveyor means; a plurality of peripherally spaced pocket-forming units carried by and extending transversely between said disks; each pocket-forming unit comprising a plurality of helical springs spaced in a chordal line extending outwardly from said drum; a flexible tube covering each said helical spring; and driving means for rotating said drum, said disks, and said pocket-forming units carried by said disks to advance articles along said conveyor means.

7. A shrink tank according to claim 6 and wherein the chordal lines in which said plurality of springs are disposed extend rearwardly relative to the direction of rotation of said drum and relative to the direction in which said articles are advanced along said conveyor means.

8. A shrink tank according to claim 7 in which the periphery of said drum comprises a plurality of spaced, annular, parallel hoops.

9. A shrink tank according to claim 7 in which said conveyor means comprises endless belt conveyor means extending from adjacent the bottom and middle of said tank upwardly toward opposite ends of said tank and means for driving said endless belt conveyor means.

10. A shrink tank according to claim 7 in which said conveyor means comprises a first endless belt conveyor extending from the top of the intake end of said tank down toward the bottom of the middle of said tank, and a second endless belt conveyor extending from the bottom of the middle of said tank upwardly to the top of the discharge end of said tank, and means for driving said belts.

11. A continuous dipping tank for articles to be immersed in liquid, comprising a liquid-tight tank, endless conveyor means having upper stretch means extending downwardly in the tank between two spaced points adjacent the top of the tank, means for moving said upper stretch means, a wheel mounted with its axis of rotation above said tank and transverse to the direction of movement of said upper stretch means and having its lower portion within the tank above the upper stretch means, a roller under and engaging said upper stretch means offset rearwardly from said wheel in the direction of movement of said upper stretch means, and means biasing upwardly said roller and thereby said upper stretch means, said upper stretch means and wheel providing a space therebetween for passage of articles, said wheel aiding in maintaining the articles in contact with said upper stretch means.

References Cited in the file of this patent

UNITED STATES PATENTS

| | | |
|---|---|---|
| 319,028 | Rochlitz | June 2, 1885 |
| 532,623 | Wright | Jan. 15, 1895 |
| 678,328 | Bancroft | July 9, 1901 |
| 757,186 | Fancher | Apr. 12, 1904 |
| 830,933 | Skinner | Sept. 11, 1906 |
| 915,425 | Gerstkemper | Mar. 16, 1909 |
| 1,185,329 | Janisch | May 30, 1916 |
| 1,492,132 | Kaster | Apr. 29, 1924 |
| 1,516,016 | Kallenbach | Nov. 18, 1924 |
| 1,617,630 | Gay | Feb. 15, 1927 |
| 1,891,908 | Bernotow | Dec. 27, 1932 |
| 2,394,996 | Hill | Feb. 19, 1946 |